United States Patent
Randic

(10) Patent No.: US 9,231,978 B2
(45) Date of Patent: Jan. 5, 2016

(54) CRYPTOGRAPHIC CONSTRUCTION FOR ANONYMITY DURING INTERACTION FOR COLLECTIVE OUTCOME

(71) Applicant: Mirko Randic, San Jose, CA (US)

(72) Inventor: Mirko Randic, San Jose, CA (US)

(73) Assignee: Mirko Randic, San Jose, CA (US)

( * ) Notice: Subject to any disclaimer, the term of this patent is extended or adjusted under 35 U.S.C. 154(b) by 0 days.

(21) Appl. No.: 14/172,896

(22) Filed: Feb. 4, 2014

(65) Prior Publication Data

US 2014/0245455 A1    Aug. 28, 2014

Related U.S. Application Data

(60) Provisional application No. 61/760,267, filed on Feb. 4, 2013.

(51) Int. Cl.
G06F 21/00    (2013.01)
H04L 29/06    (2006.01)

(52) U.S. Cl.
CPC ........................... *H04L 63/20* (2013.01)

(58) Field of Classification Search
CPC ..................... H04L 63/0421; H04L 63/20
See application file for complete search history.

(56) References Cited

U.S. PATENT DOCUMENTS

| 8,316,237 | B1 * | 11/2012 | Felsher | H04L 9/0825 380/282 |
| 8,799,135 | B2 * | 8/2014 | Duquette | 705/36 R |
| 2007/0106892 | A1 * | 5/2007 | Engberg | 713/168 |
| 2009/0122812 | A1 * | 5/2009 | Steiner et al. | 370/503 |
| 2010/0306249 | A1 * | 12/2010 | Hill et al. | 707/769 |
| 2012/0124161 | A1 * | 5/2012 | Tidwell et al. | 709/217 |
| 2012/0311657 | A1 * | 12/2012 | Boldyrev | H04W 12/02 726/1 |

\* cited by examiner

*Primary Examiner* — Morshed Mehedi

(57) ABSTRACT

A process where everyone can interact by broadcasting encrypted conditional commitment segments, and at the end, everyone must undisputedly agree on quantifiable collective outcome, and no-one should know which way anyone else intentions was.

1 Claim, 6 Drawing Sheets

REAL INTERACTION ENVIRONMENT

| |
|---|
| Event 1 = Participant 1 selects Choice 1 and Participant 2 selects Choice 1. |
| Event 2 = Participant 1 selects Choice 1 and Participant 2 selects Choice 2. |
| Event 3 = Participant 1 selects Choice 2 and Participant 2 selects Choice 1. |
| Event 4 = Participant 1 selects Choice 2 and Participant 2 selects Choice 2. |

TABLE 1 - Real Event definition

| |
|---|
| Outcome 1 = Sum of Choices 1 equals 2, and sum of Choices 2 equals 0. |
| Outcome 2 = Sum of Choices 1 equals 1, and sum of Choices 2 equals 1. |
| Outcome 3 = Sum of Choices 1 equals 0, and sum of Choices 2 equals 2. |

TABLE 2 - Real Outcome definition

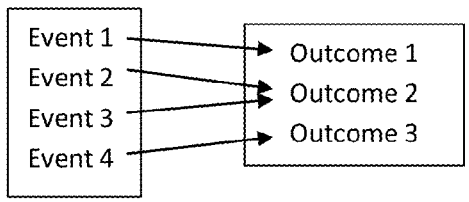

TABLE 3 – Real Rules or relations among real Events and real Outcomes defined

FIG. 2

MODEL INTERACTION ENVIRONMENT

Event 1 = ##A####B##
Event 2 = ##C####D##
Event 3 = ##E####F##
Event 4 = ##G####H##

TABLE 4 – Model Event definition

Outcome 1 = ###OUT1###
Outcome 2 = ###OUT2###
Outcome 3 = ###OUT3###

TABLE 5 – Model Outcome definition

TABLE 6 – Model Rules or relations among model Events and model Outcomes defined Use of surjective one-way function in process Event 1 = ##A####B## = Participant 1 selects Choice 1 and Participant 2 selects Choice 1
Event 2 = ##C####D## = Participant 1 selects Choice 1 and Participant 2 selects Choice 2
Event 3 = ##E####F## = Participant 1 selects Choice 2 and Participant 2 selects Choice 1
Event 4 = ##G####H## = Participant 1 selects Choice 2 and Participant 2 selects Choice 2

Table 7 Correlation among interaction model events with real events

FIG. 5

Distribution of sub segments for interaction

Sub-segment 1 = ##A## = Participant 1 selects Choice 1
Sub-segment 2 = ##C## = Participant 1 selects Choice 1
Sub-segment 3 = ##E## = Participant 1 selects Choice 2
Sub-segment 4 = ##G## = Participant 1 selects Choice 2
Sub-segment 5 = ##B## = Participant 2 selects Choice 1
Sub-segment 6 = ##F## = Participant 2 selects Choice 1
Sub-segment 7 = ##D## = Participant 2 selects Choice 2
Sub-segment 2 = ##H## = Participant 2 selects Choice 2

Table 8 Sub-segments for distribution to participants

Participant 1 selects Choice 1   = ##A## and ##C##
                                       ( set of two sub segments )
Participant 1 selects Choice 2   = ##E## and ##G##
                                       ( set of two sub segments )

Table 9 Participant 1 segments.

Participant 2 selects Choice 1 = ##B## and ##F##
                                       ( set of two sub segments )
Participant 2 selects Choice 2 = ##D## and ##H##
                                       (set of two sub segments )

Table 10 Participant 2 Segments.

FIG. 6

CRYPTOGRAPHIC CONSTRUCTION FOR ANONYMITY DURING INTERACTION FOR COLLECTIVE OUTCOME

BACKGROUND and BENEFITS

Today, in on-line business, social and administrative interactions we rely on cryptographic methods to provide security, authentication, integrity and non-repudiation. However, authentication and non-repudiation requires trusted third party (TTP) to provide such assurances. TTP is also known as trusted authority (TA) or certification authority (CA) and is managed by Public Key Infrastructure (PKI).

There are inherited vulnerabilities in every computer use if user has no complete and absolute control of all processes running on machine. Computer use in cryptography is essential because of practical computational power but does not influence much mathematical principles of process. Computer user's secret data or messages associate with intended application can also be used in another application of which he is not aware and his secret data and messages can be misused. To make things worse, there is no verifiability built in message exchange process. When user discovers that his data or message is misused it is often too late to repair damage by revocation of message.

The new method brings anonymity with verifiability to traditional set of cryptographic assurances. The role of TTP diminishes and there is no need for TTP existence after application and participants are defined and set with all necessary processes and tools in place. At this point, to additionally increase mutually assured trust, all cumulated knowledge into single point of TTP can be erased because there is no need for it. In traditional TTP role the knowledge is permanently needed for authorization, identification and revocation processes.

Anonymity benefits are to avoid retaliation if disagreed with authority during interaction or to avoid unnecessary strength to personal relationship. The value of on-line anonymity in business, public and management interactions is to separate personal from application role attributes and help to focus attention on application core objectives.

The verifiability provides capability that any alteration of message can be easily detected in real time. Also, process outcome can be independently verified without compromising anonymity of other participants. If necessary, revocation process can be initiated prior the real damage is inflected.

SUMMARY AND BRIEF DESCRIPTION

The nature of this innovation is constructing the interaction method which carries only knowledge of participant's intention toward collective outcome. Operation of such interaction depends on preparation process which needs to include all participants' possibilities with its quantifiable outcomes toward collective outcomes. The preparation part of this process provides and distributes segmented parts of possible intentions to participants. Participants openly communicate their intentions by publishing appropriate segments which correspond to their individual intentions or choices. The collective interaction outcome is determined based on only one possible combination of collected segments which can be decrypted with integrity. The purpose of such interaction is providing anonymity with indisputability of collective outcome. The anonymity is provided because there is no knowledge of individual intention although we can track messages with sub segments to its source. The indisputability is assured by accuracy verification of collective outcome each participant can perform in his privacy. Once the semantic pay-load (or impact knowledge which message carry) toward overall outcome is decoupled from the meta-content of message, there is no more visibility from which source this impact comes. Decoupling is based on cryptographic surjective one-way function. To perform verification in his private environment, each individual participant can change his intention and using other participants already published segments determine appropriate change in new hypothetical outcome in privacy of his own processing environment to gain confidence in accuracy of the whole process.

This new process is less vulnerable from other methods because rightful participant can, after determining potential misuse in real time, take recovery actions to minimize damages. The technique does not require a trusted authority; rather Out-of-Band created, segmented and distributed knowledge sub segments.

DESCRIPTION OF FIGURES

FIG. 2 illustrates Real Interaction Environment

FIG. 5 shows correlation among interactions in model events with real events FIG. 6 illustrates distribution of sub segments for interaction

DETAIL DESCRIPTION

To describe the process we are using the simplest possible application example of voting with two participants and with two equal choices for each participant, which generate quantifiable outcome by adding each type of choice into summary groups. Other more complex applications can have different rules and boundary limits, but basic steps, as described here, are the same. Also other applications can have multiple round of interaction with even different participants, or outcome calculation can involve complex mathematical algorithms, or even fuzzy logic. The number of choices and meaning of choices for participants can wary, depending on its role in application. The choices don't need to have equal leverage toward common outcome. The mix of anonymous and open interaction can coexist.

Figure 1:
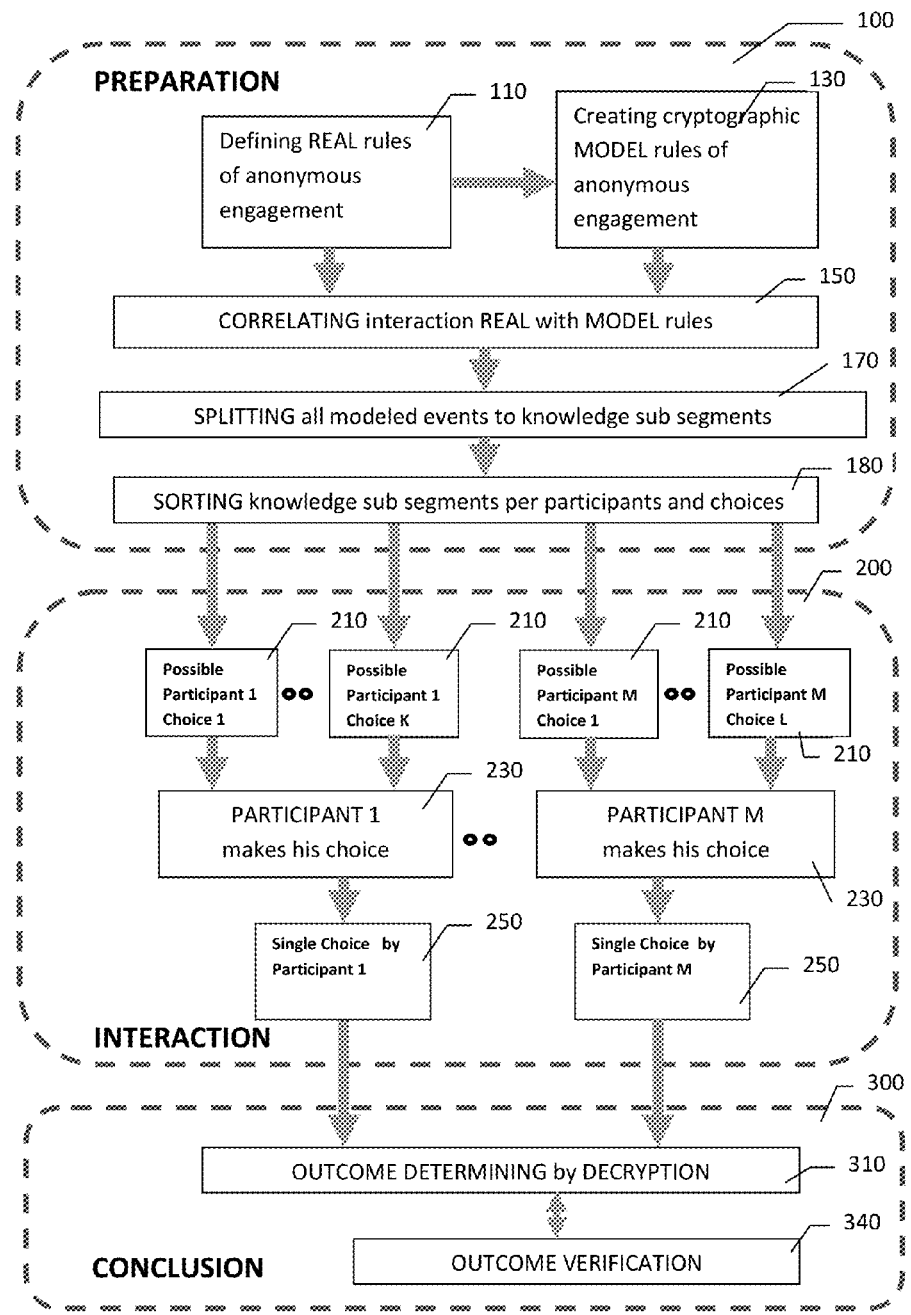
FIG. 1 illustrates whole process as block diagram

The process consists of three main phases: Preparation (100), Interaction (200) and Conclusion (300) as shown in FIG. 1.

Figure 3:
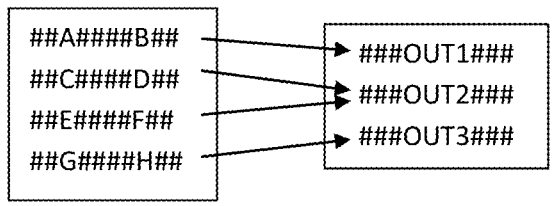
FIG. 3 illustrates Model-ed Interaction Environment

In preparation phase it is necessary to define real engagement rules (or real rules) of each possible real event of particular interaction (110). The real rules are shown in FIG. 2, table 3, real events in table 1 and real outcomes on table 3 for our simple voting example. Beside real environment, there are virtual models of such environment (130) represented in table 4 for model events, table 5 for model outcomes and table 6 for model rules on FIG. 3. Corresponding elements of both environments sets are possible events, possible outcomes and relation among them. In real environment we have simple language logical description in plain text where each participant should understand the rules of the interaction for particular application. In modeled environment from FIG. 3 instead of elements in natural language we have numerical combination of characters which have exact relations among themselves as corresponding elements in real environment from FIG. 2. Surjective relations among elements from table 3 and table 6 are identical.

To show diversities of numerical combinations in this detail process description, we use substitute character "#" which represent any valid single or combination of valid characters similar to use of WILD CHARACTERs in computer programming.

In process of creating cryptographic model of anonymous engagement (130), we use standard symmetrical encryption process (AES for example) with unique password (##AppIDpsw##), which is associated with all modeled relations for particular application instance. After common password we arbitrary define random numeric combinations for each valid outcome (##OUTn##) as shown in table 5. In case where single outcome models (##OUTn##) need to correspond to multiple model events (##X####X## and ##Y####Y##) we arbitrary use different numerical value as seed in encryption process as shown on FIG. 4 in case for ##OUT2##. In cryptography the seed is random number which defines entropy for each encryption process and is not needed to decrypt cipher back to original plaintext value. However, different seeds cause creation of different encryption results or ciphers, although for each of these ciphers by decryption we are getting the same source value or plaintext. On this way we can create table 4. With table 4 and table 5 we create table 6 with the same surjective relations as defined in table 3.

At this time we have all components or necessary knowledge to create FIG. 5, table 7 which is actually correlations of interactions of real rules with model rules (150).

After that the whole application knowledge from table 7 can be segmented by decomposing it into sub segments where each participant would have appropriate set of sub segments for each choice he may want to make according to application rules toward unique collective outcome (170). As result of segmentation for our application example of simple voting we should have eight sub segments to create FIG. 6, table 8. To prevent possible collision during decryption in conclusion phase (300) table 8 need to be checked that there is no two equal model combination present. Using sub segments from table 8 we sort them into groups or segments to be distributed to participants with indication which sub group to be used for particular choice participant may make (180). For each choice there is more than one sub segment to be published and they are grouped for each choice into set of sub segments as shown in table 9 or table 10. Once all sub segments from table 8 are distributed to participants (table 9 to participant 1 and table 10 to participant 2) there is no need for knowledge from table 4, table 6, table 7 and table 8 to be stored because it present risk to anonymity and such tables can and should be destroyed to preserve privacy of participants. The preparation process (100) ends with distribution of sub segments to participants they may use to publish their choices during privacy protected interaction toward collective outcome in particular application.

The interaction phase (200) consists when each participant (230) makes his decision by publishing his choice or decision (250) related to common outcome among all available possibilities (210) per participant. In our example of simple voting this would be for participant 1 selecting and publishing one choice from table 9 in form of set of sub segments and participant 2 publishes his choice from table 10 each of them in their privacy.

Figure 4:
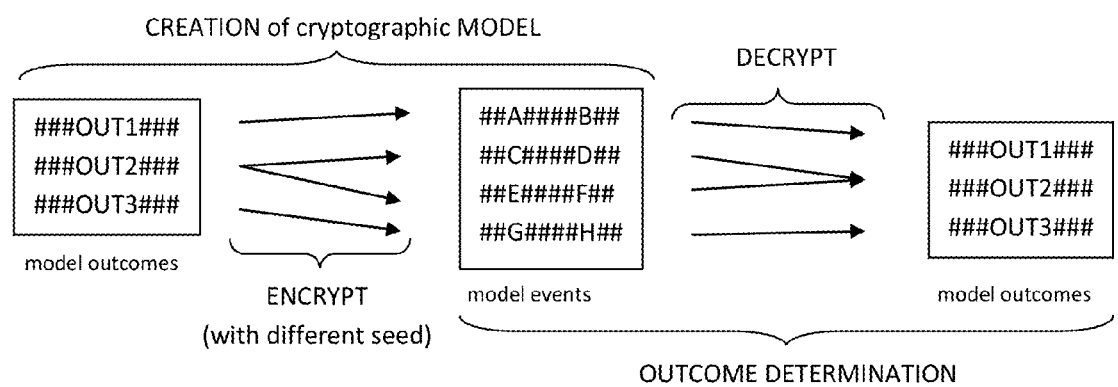
FIG. 4 illustrates use of surjective one-way function

After collection of all published choices (250) in form of sets of sub segments at one place in conclusion phase (300) the actual collective outcome can be determined by decrypting (310) all possible combinations of published and collected sub segments (250). If there is no collision in decryption process as shown in FIG. 4 the only one combination will produce valid model outcome from table 5. All other combinations should produce integrity violation warning during decryption process and should be discarded.

The unique and quantifiable collective outcome in real environment is determined from table 2 and based on model outcome definition from table 5 is calculated as result of description process (310).

Participant cannot know how other participant make his choice because based on process from FIG. 4 he cannot determined which unique model event caused such outcome based on model outcome and without knowing other participant options from his table 9 or table 10 respectfully. To prevent privacy diminishing for other instance of the same application other numerical combinations for password and seeds should be used in preparation process.

The verification (340) can be performed by each participant in privacy of his computational environment to determine that his choice is implemented correctly into outcome. This can be done on the way that he uses his other choice instead with other participants already published segments to determine new outcome in privacy of his own cryptographic resources. The new outcome should accurately reflect only change participant made by his new hypothetical choice.

If there are only two participants together in application the logical abstraction can be made by participant to discover other participant's choice selection. To preserve anonymity of other participants there should be three or more participants in application or self verification should be prevented by hiding common password.

What is claimed is:

1. A method of performing privacy preserving interaction process for collective outcome having multiple steps, the method compromising comprising:

defining a set of real rules of interaction in natural language which consist of sets of real events, set of real outcomes and surjective relations among said sets of real events and said set of real outcomes;

defining unique cryptographic password for each instance of said interaction process and defining unique name for each possible model outcome which correspond to each of said real outcomes;

encrypting each of model outcomes into model events with considerations for cases where additional events with surjective nature of relations among said real events and said real outcomes using different initiation vector to produce said model events;

splitting said produced set model events into sub segments and sorting said sub segments into groups organized by participants and further grouped by possible valid choices;

distributing organized groups of said sub segments to corresponding participants while destroying in the same time all reminding knowledge of said produced model events from memory of computational apparatus where cryptographic and table driven logical operations were performed;

participants in their privacy selecting their single choice by broadcasting said sub segments associate with their choice;

recreating all possible said model events by collecting all published said sub segments from all participants and finding one with integrity which produce unique said model outcome by decrypting each recreation and while in said unique model outcome together with knowledge of said set of real rules determine collective outcome with preserved privacy of participant.

* * * * *